Oct. 11, 1966 L. J. WALLACE 3,278,754

PHOTOSENSITIVE DOUBLE DOCUMENT DETECTOR

Filed Sept. 16, 1964 2 Sheets-Sheet 1

INVENTOR
LEONARD J. WALLACE
BY Ronald J. Clark
ATTORNEY

United States Patent Office 3,278,754

Patented Oct. 11, 1966

3,278,754

PHOTOSENSITIVE DOUBLE DOCUMENT DETECTOR

Leonard J. Wallace, Vestal, N.Y., assignor to International Business Machines Corporation, New York, N.Y., a corporation of New York Filed Sept. 16, 1964, Ser. No. 396,969
4 Claims. (Cl. 250—223)

This invention relates to proximity detectors and more particularly to a proximity detector of the non-contacting type.

The instant invention is directed to a detector useful in determining the presence or absence of an object without the requirement of making physical contact with the object. The adaptation of a single embodiment of this proximity detector is herein disclosed for use in detecting the presence of a moving paper document, a bank check, prior to its being processed in an automatic data processing system.

Normally, in a bank bookkeeping operation each check is processed individually by a document reading apparatus. This apparatus employs character sensing, hole sensing, or magnetic sensing mechanisms to read the data contained on the check. Great care is exercised in designing the feed mechanisms for each check reading apparatus to insure that only one check is fed at a time to the reading apparatus. Inevitably, situations occur wherein two checks are fed together into the reading apparatus. It is such a situation that the present invention is employed to detect. Additionally, the instant invention prevents the loss of the second document by operating auxiliary circuits to retrieve these documents from the normal processing operation.

In the double document situation, the reading apparatus operates to read the uppermost check. The lower check does not interfere with a reading process in which low gain magnetic reading heads are employed. The information on the lower document is lost and the lower document itself may become lost in any subsequent sorting operation. In order to prevent the loss of the lower document, the instant invention is employed to trigger an auxiliary device for removing the two documents from the normal processing operation.

The problem of detecting the presence of the double document is complicated by the size of the document which must be detected. Checks are only a few thousandths of an inch in thickness, and they are applied to a document reading apparatus at the rate of sixteen hundred per minute. Although the double document situation occurs rather infrequently, it requires many hours to locate the whereabouts of the lost check.

Accordingly, it is an object of the instant invention to provide a detector of the non-contacting type.

It is a further object of the instant invention to provide a detector which indicates the presence of a document when it is a predetermined distance from the detector.

It is another object of the instant invention to provide a proximity detector which is adjustable over a sufficient range of distances to detect paper documents passing within that range.

An additional object of the instant invention is to provide a detector of the non-contacting type employing an optical assembly indicating the distance of a document from the detector by generating a variable current corresponding to distance and a threshold amplifier responsive to a preset current to indicate the presence of the document.

A still further object of the instant invention to provide a closed loop detection system for detecting double documents moving in a document processing operation and for retrieving those documents from the normal operation to prevent the loss of a document.

According to these objects, the instant invention employs an optical assembly comprising a lamp as a source of light, a first fiber bundle to direct the light onto a document passing beneath, a second fiber bundle to collect the reflected light, and a solar cell responsive to the reflected light for generating a variable current which is proportional to the distance of a document passing beneath the ends of the optic bundles. A variable threshold amplifier is pre-set to turn on in response to a predetermined current corresponding to a detection range. A preferred embodiment of the instant invention for use in a document processing operation employs a pair of detector assemblies positioned on opposite sides of a feed channel and a control circuit responsive to the output signals of the detector assemblies for removing a double document from the normal processing operation.

The foregoing and other objects, features and advantages of the invention will be apparent from the following more particular description of a preferred embodiment of the invention, as illustrated in the accompanying drawings; wherein.

Figure 1:
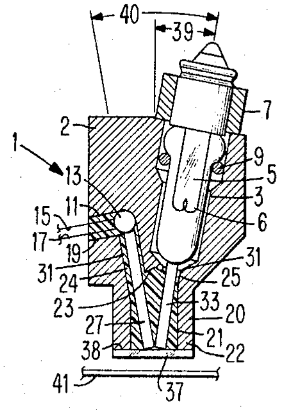
FIG. 1 is a sectional view of an optical assembly employed in the instant invention.

Referring to FIG. 1, there can be seen a sectional view of an optical assembly 1 employed in the instant invention. A housing 2 is formed with a top cavity 3 into which a lamp 5 is inserted. The lamp 5 is equipped with a filament 6. A cap 7 is attached to the housing 2 by a screw, not shown, and is employed to hold the lamp 5 securely within the top cavity 3. A sealing ring 9 prevents dust from penetrating the cavity, thereby maintaining a constant light intensity output from the lamp 5. Without the ring 9, dust could accumulate in the cavity 3, and could reduce the light output from the lamp 5. The light output, as described hereinafter, is one factor in obtaining the desired detection range of the detector assembly. Additionally, the sealing ring decreases the lamp filament vibration, thereby reducing any possible variation in light intensity. The housing 2 is equipped with an additional side cavity 11 into which a solar cell 13 is inserted. The solar cell is equipped with a pair of leads 15 and 17 from which electrical signals may be taken for application to an external variable threshold amplifier circuit, shown in FIG. 4. The solar cell 13 is held within the side cavity 11 by a potting material 19. The potting material 19 is employed to optically isolate the solar cell from light originating external the housing 2. A suitable potting material 19 is that identified as Hysol Epoxi, Kit No. 11C, Black. A suitable solar cell is that identified as No. LS230 manufactured by the Texas Instrument Co. A suitable lamp is that identified as No. TS-4 manufactured by the Tung-Sol Electric Co.

The housing 2 includes a projection 20 formed with a cylindrically shaped central cavity 21 which originates from the lower end 22 of the projection 20 and terminates in a cone-shaped cavity 23 internal the housing 2 and integral with the cavity 21. Additionally, the housing 2 is formed with a first passage 24 which communicates from the recess 11 to the cavity 23 and with a second passage 25 which communicates from the recess 3 to the cavity 23. A first fiber bundle 27 is placed within the passage 24 extending through the cavity 23 into the cavity 21. The bundle 27 extends into the cavity 21 to a point slightly less than aligned with the end 22 of the housing 2 and transmits light to the solar cell 13. The bundle 27 is held within the circular recess by potting material 31. A suitable potting material 31 is that identified as a mixture comprising ten parts of Hysol Resin No. 2038 to one part of Hysol Hardener No. 3146 to one-half part of Conap Black Pigment No. 1802. A second fiber bundle 33 is placed within the passage 25 extending through the cavity 23 into the cavity 21. The bundle 33 extends into the cavity 21 to a point slightly less than aligned with the end 22 of the housing 2 and transmits the light originating frim the lamp 5. The bundle 33 is rigidly held in place by the potting compound 31. A glass cover 37 protects the ends of the fiber bundles 27 and 33. The bundles are positioned within a thousandth of an inch from the inner surface 38 of the glass cover 37 to reduce any reflection from that surface 38.

The bundles 27 and 33 are separated from the vertical by an angle 39 of 10°. The fiber bundles chosen for use in the instant invention have a contributing factor-fibers aligned-core to clad ratio greater than 85 percent and a numeric aperture of .60 wherein the fiber size is 12 i.e. 0.0005 inch.

The potting material 31 decreases any possible ambient light pick up and insures the close alignment of the fiber bundles 27 and 33 at the proper angle of 10° from the vertical. The fibre bundles are positioned in a single plane passing vertically through the assembly 1 and they have an included angle 40 of 20°. The angle 40 determines both the distance of an object 41 at which the maximum current is obtained from the assembly and the off current of the assembly.

Figure 6:
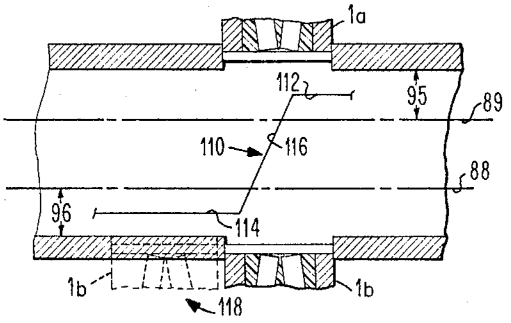
FIG. 6 is a schematic view showing a crumpled document passing between a pair of detector assemblies.

Each of the fiber bundles 27 and 33 is approximately rectangular in cross section having dimensions of 0.032 inch by 0.072 inch. These dimensions are not critical but they are preselected because this fiber bundle size closely matches the dimension of the active element in the photo cell 13 resulting in maximum utilization of all light transmitted through the fiber bundle. Additionally, this size fiber bundle provides a high concentration of light in a small pattern over the operating range of the detector assembly. Finally, this size fiber bundle increases the sensitivity of the assembly to detect an object having its surface oblique to the end 22 of the housing 2. For example, a crumpled check, as shown in FIG. 6, has many surfaces at varying oblique angles with the end 22.

Figure 2:
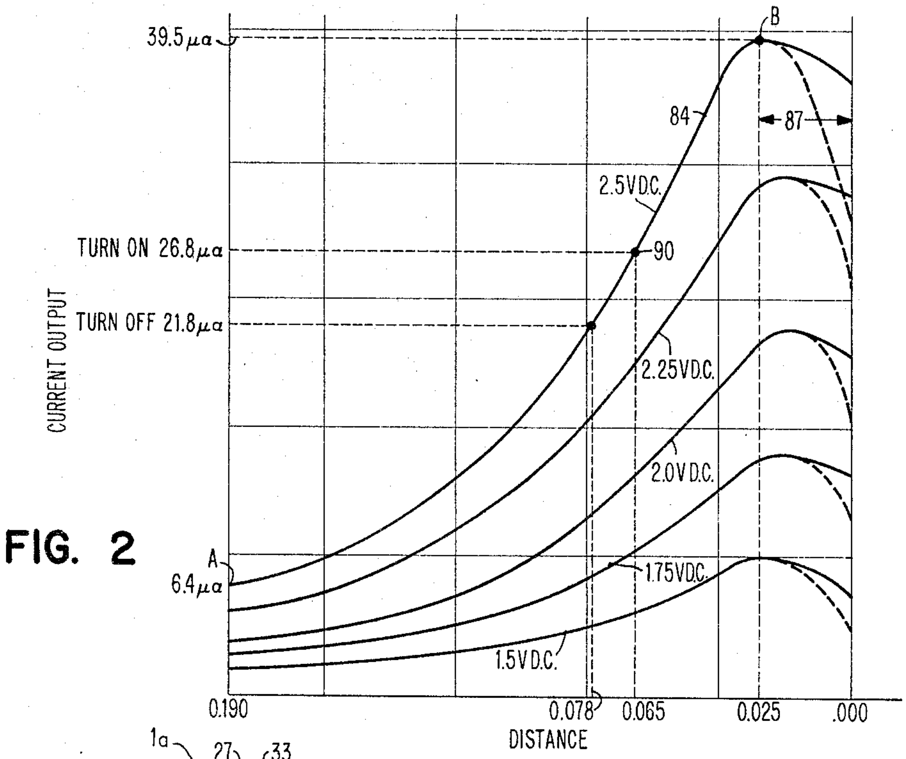
FIG. 2 shows a set of characteristic curves associated with the assembly shown in FIG. 1.

FIG. 2 shows a set of characteristic curves generated by the optical assembly shown in FIG. 1. Each curve is generated by having a different voltage impressed on the lamp filament 6 and by measuring the solar cell output current corresponding to the progressively greater distances an object 41 is moved from the end 22 of the housing 2.

Figure 4:
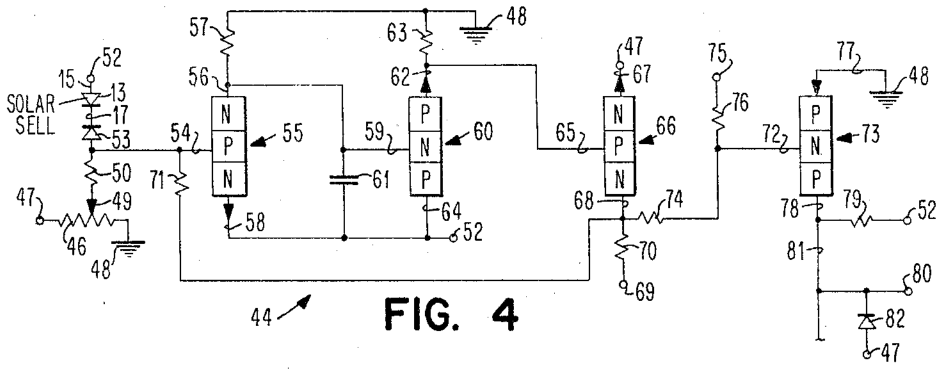
FIG. 4 is a schematic diagram of the variable threshold amplifier employed in the instant invention.

FIG. 4 shows a schematic diagram of a variable threshold amplifier 44 employed in the instant invention. A threshold adjustment resistor 46 is connected between a voltage source 47 and ground potential 48. The voltage source 47 may be at a —6 volts level. The resistor 46 is equipped with a variable center tap 49 which is connected to a current limiting resistor 50. The solar cell 13 is connected to a second potential source 52 by its lead 15 and to a diode 53 by its second lead 17. The voltage source 52 may be at a —12 volts level. The diode 53 is connected to pass the current generated by the solar cell 13 and is connected to the junction of the resitor 50 and a base lead 54 of a first transistor 55. The diode 53 protects the transistor 55 from burn out upon the occurrence of a solar cell failure and the subsequent application of the full —12 volts from the potential source 52 to the base lead 54. The diode 63 burns out first and provides an open circuit between the potential source 52 and the transistor 55. A collector lead 56 of the transducer 55 is connected to ground 48 by a current limiting resistor 57. An emitter lead 58 of the transistor 55 is connected to the potential source 52.

Figure 5:
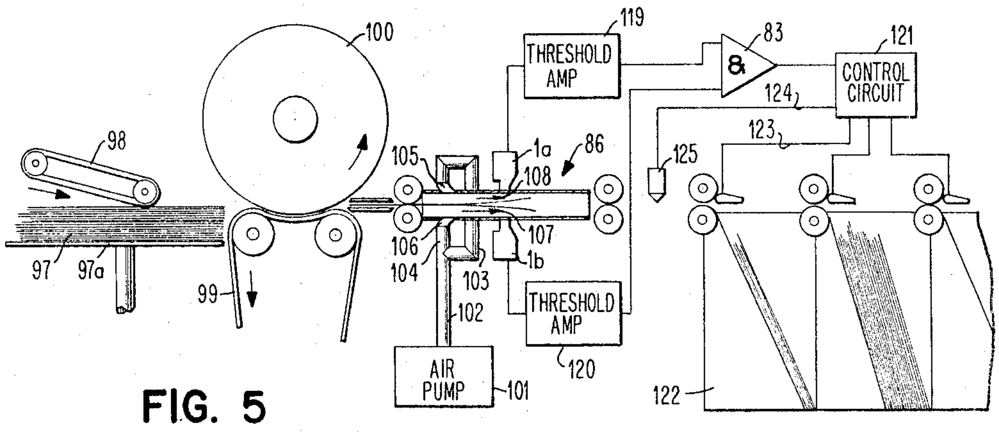
FIG. 5 shows an embodiment of the instant invention employed to detect double documents.

The collector lead 56 is also connected to a base lead 59 of a transistor 60 and to one side of a capacitor 61. The other side of the capacitor 61 is connected to the potential source 52. An emitter lead 62 of the transistor 60 is connected to ground potential 48 by a current limiting resistor 63. A collector lead 64 of the transistor 60 is connected to the potential source 52. The emitter lead 62 of the transistor 60 is connected to a base lead 65 of a transistor 66. An emitter lead 67 of the transistor 66 is connected to the potential source 47. A collector lead 68 of the transistor 66 is connected to a potential source 69 by a current limiting resistor 70. The potential source 69 may be at a voltage level of +6 volts. The junction of the collector lead 68 and the resistor 70 is connected to the base lead 54 of the transistor 54 by a feedback resistor 71. The collector lead 68 is also connected to a base lead 72 of a switching transistor 73 by a resistor 74. The base lead 72 is also connected to a potential source 75 by a resistor 76. The potential source 75 may be at a potential of +12 volts. An emitter lead 77 of the transistor 73 is connected to a ground potential 48. A collector lead 78 of the transistor 73 is connected to the potential source 52 by a resistor 79 and to an output terminal 80 by a line 81. The junction of the line 81 and the output terminal 80 is connected to the potential source 47 by a diode 82. The diode 82 is connected so as to prevent the output terminal from becoming more negative than a —6 volts. Signals are available at the output terminal 80 for application to logic circuitry shown in FIG. 5 represented by the AND gate 83.

The operation of the amplifier circuit shown in FIG. 4 is as follows. With no voltage developed by the solar cell 13, the transistor 55 is in full conduction. The base lead 59 of the transistor 60 is at —12 volts, and the transistor 60 is in full conduction. The conduction of the transistor 60 causes the base lead 65 of the transistor 66 to become negative, thus cutting off the transistor 66. This action causes the transistor 73 to be cut off.

With a particular current threshold level set by the combined operation of the resistors 46 and 50 and the voltage source 47, and the solar cell 13 generating a current from reflected light exceeding this particular current level, the transistor 55 is cut off thereby cutting off the transistor 60. With the transistor 60 cut off, the base lead 65 of the transistor 66 is at ground potential, thereby placing the transistor 66 into full conduction. A latch back voltage current is applied to the base lead 54 of the transistor 55 by the resistor 71. Additionally, the switching transistor 73 is placed in full conduction, thereby generating a positive going pulse at the output terminal 80

Figure 3:
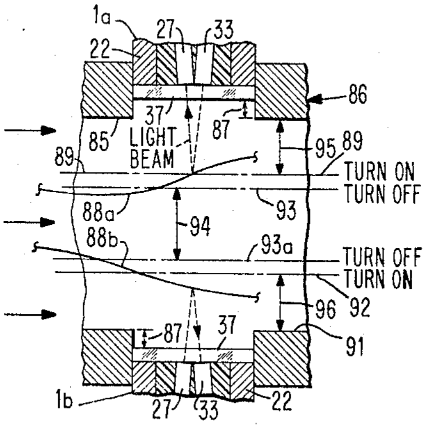
FIG. 3 is a sectional view of a document feed channel showing the operation of the instant invention to detect double documents.

The operation of the optical portion of the instant invention is discussed with relation to FIG. 3 with references to FIGS. 1, 2 and 4. A filament voltage is applied to the filament 6 of the lamp 5 shown in FIG. 1. This voltage for the purpose of the description is at a 2.5 volt D.C. level and the expected assembly current ouput is represented by a curve 84 shown in FIG. 2. The amplifier circuit shown in FIG. 4 is adjusted to turn on at any current value at this level of voltage from 6.4 micro-amps to 39.5 micro-amps, which currents correspond to distances of 0.190 inch, point A, and 0.025 inch, point B respectively on the curve 84.

In FIG. 3, the optical assemblies 1*a* and 1*b* are shown recessed from an upper wall 85 of a channel 86 by a distance represented by a line 87, which distance is obtained by reference to the curve 84 in FIG. 2. The amount of recess equals 0.025 inch and corresponds to a distance such as to obtain a maximum current output from the assembly 1*a* and 1*b* when an object is placed flush with the wall 85 of the channel 86. The recessing of the optical assemblies limits the usable portion of the curve 84 to the area between points A and B. The use of the remaining portion of the curve may not indicate a double document situation when low reflectance documents pass closer to the end 22 of the assembly 1 than 0.025 inch.

Referring again to FIG. 3, a portion of a document channel 86 is shown with portions of two documents 88*a* and 88*b* contained therein. The channel 86 and the fluttering action of the documents represented by the wavy lines 88*a* and 88*b* is shown again and explained in greater detail with reference to FIG. 5. For the purpose of this description, the amplifier 44 is set to turn on at 26.8 micro-amps, which current is associated with a distance of 0.065 inch between the end 22 of the housing 2 and the upper document 87 as seen by reference to FIG. 2.

To understand clearly the operation of the instant invention, it is helpful to designate the physical sizes of selected elements comprising the instant invention. The channel 86 has an inside width of 0.156 inch and the documents 88*a* and 88*b* are approximately 0.003 inch in thickness. The detector assembly has been pre-set to turn on when the document 88*a* is 0.040 inch away from the side 85 of the channel 86. This turn on distance is represented by the line 89 and is selected by reference to the calibration curves shown in FIG. 2. Incident light passing through the fiber bundle 33 is reflected by the document 88*a* and the reflected light is transmitted by the fiber bundle 27 to the solar cell 13 shown in FIG. 1. The current value generated by the solar cell equals the current value indicated at point 90 on the curve 84 shown in FIG. 2. This current is applied to the amplifier circuit shown in FIG. 4 for turning on the switching transistor 73 as previously described.

A segment of a second optical assembly 1*b* is shown mounted on the lower side 91 of the channel 86. This second assembly operates in the same manner as the upper assembly to detect the presence of a second document 88*b*. The second assembly is adjusted to turn on when the document 88*b* is within the range of the assembly indicated by the line 92. The line 92 represents a distance of 0.040 inch from the side 91 of the channel 86. The variable threshold amplifier associated with each of the optical assemblies remains on until their respective documents pass beyond the range equal to their turn off currents. The amplifier described herein requires a turn off current of 5 micro-amps less than their turn on current. Referring to FIG. 2, a turn off current of 21.8 micro-amps corresponds to a distance of 0.078 inch. Therefore, the variable threshold amplifier associated with each assembly 1 remains on until its respected documents 88*a* and 88*b* are further away than the distance indicated by the lines 93 and 93*a* respectively. A document passing in the channel between the lines 93 and 93*a*, indicated by a vertical line 94, passes through undetected in the embodiment described. However, documents do not pass through this portion as explained hereinafter with reference to FIG. 5.

In summary, the upper optical assembly 1*a*, shown in FIG. 3, examines an upper inspection zone represented by a vertical line 95 for the presence of a first check. The lower assembly 1*b* examines a lower inspection zone represented by a vertical line 96 for the presence of a second check. A check passing through any other portion of the channel is undetected. However, the normal action of the checks moving in the channel indicates that the checks do move in the upper and lower inspection zones respectively. Also, for various circumstances, the depth of the inspection zones can be altered by changing the turn-on current of the amplifier 44 to meet the requirements of each situation.

FIG. 5 is a schematic representation of the instant invention showing its use in a document feeding arrangement for detecting double documents. A plurality of documents 97 are held in a document storage bin 97*a*. Normally, a single document is taken from the storage bin 97*a* by a document picker mechanism represented in FIG. 5 by a picker belt 98, a restraint belt 99 and a separator wheel 100. The wheel 100 and the picker belt 98 are shown moving counterclockwise to remove one document from the storage bin 97*a*. The restraint belt 99 is shown moving clockwise to prevent the removal of more than one document at a time. The document selection mechanism guides the selected document into the channel 86 which constrains the document or documents within the operating range of the pair of optical assemblies 1*a* and 1*b*. A sectional side view of the channel 86 is used to show the manner of separating the documents 87 and 88 passing therethrough. The pair of assemblies 1*a* and 1*b* are mounted on opposite walls of the channel 86. An air pump 101 provides air under pressure, which air is introduced into the channel 86 by a conduit 102 having a pair of branch lines 103 and 104 and inject nozzles 105 and 106 respectively. The air flows in the direction shown by the arrows 107 and 108. When a pair of documents are transferred into the channel 86 in overtapped relationship, they are separated according to the Bernoulli principle by the air pressure differential between their common side and their outer side. More specifically, the pressure between the documents equals the atmospheric pressure, while the pressure at the outer side of each document is lower than atmospheric because of the injected air passing over the documents. This pressure difference forces the documents apart. In practice, neither document contacts the channel walls because of a cushion of air flowing thereon. Additionally, the documents appear to flutter as they progress through the channel aided by the flow of the injected air. Additionally, it can be noted with reference to FIG. 5 that the portions of the documents 87 and 88 preceding the nozzles 105 and 106 appear as one document. However once the documents pass the nozzles they become separated.

The flow of air tends to prevent the pair of documents from passing through the center of the channel 86. It has been found that each document passes through the channel along the upper and lower zones of the channel represented by the vertical lines 95 and 96 shown in FIG. 3. The pair of optical assemblies 1*a* and 1*b* are placed directly opposite each other on the upper and lower sides of the channel 86. This placement of the detectors prevents a crumpled document from falsely appearing as a double document. Crumpled documents have uneven surfaces which if great enough could be mistaken for a pair of documents.

Referring to FIG. 6, a single crumpled document 110 is shown whereby a first portion 112 lies in the upper detection zone 95 and a second portion 114 lies in the lower detection zone 96. The free zone is traversed by a connecting member 116 of the document. If the detector 1*b* is displaced from the detector 1*a*, for example, to the position 118 indicated by the dashed lines, each detector senses different portions of the same document. The existence of an output from the detectors 1*a* and 1*b* indicates the presence of a double document situation, however a single crumpled document is passing through the channel. The placement of the detectors 1*a* and 1*b* directly opposite each other prevents the erroneous indication of a double document situation since the connecting member is never at right angles to its first and second portions 112 and 114 respectively.

Referring again to FIG. 5, when the detectors 1*a* and 1*b* each indicate the presence of a document, their respective amplifiers 119 and 120 generate an output signal for application to the AND gate 83. The AND gate 83 applies an alert signal to a control circuit 121 which normally controls the sorting of the documents 97. In a double document situation, a single storage receptacle 122 has been designated as the receptacle into which all double documents are placed. Therefore, the output control line 123 of the control circuit 121 is energized to control the placement of the double document into the receptacle 122. The output control line 124 of the control circuit 121 is energized to control the inhibiting of a read head 125 when the double document is passing thereunder.

Figure 7:
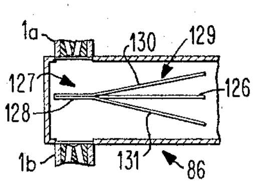
FIG. 7 is a front elevation of the channel employed in the instant invention showing the transverse placement of the optical assemblies. The same element shown in several of the FIGS. is identified by the same number.

In FIG. 7, the channel 86 is shown in end elevation to more clearly show that the optical assemblies 1*a* and 1*b* are positioned off-center of the channel 86. This placement is desirable for those situations in which a mutilated document or check 126 is inserted in a carrier document 127. The carrier document is sealed along one longitudinal end of the documents as at 128. It is improper to indicate that this combination of documents is a double document situation, since it is the accepted method of processing a mutilated document. Therefore, by placing the detectors off center and over the sealed side of the documents, the sealed end prevents sufficient separation of the documents, at the position where the detectors are placed so that portions of each document are not in the upper and lower detection zones. The carrier document 127 includes a pocket member 129 which includes a pair of sides 130 and 131. A back panel which connects these two sides is not shown. In response to the injected air, the sides 130 and 131 separate and would indicate a double document situation for a different placement of the detectors 1*a* and 1*b*.

While the invention has been particularly shown and described with reference to a preferred embodiment thereof, it will be understood by those skilled in the art that various changes in form and details may be made without departing from the spirit and scope of the invention.

What is claimed is:

1. A device for detecting the feeding of overlapped documents comprising:

a channel having a pair of mutually spaced opposed walls between which documents are adapted to be fed in one by one succession, means for introducing air into said channel from a point on each of said walls along the direction of document motion for separating a plurality of documents inadvertently introduced into said channel in overlapping relationship, an optical detector assembly mounted on each of said walls, each of said optical detector assemblies generating light for application into said channel and including a solar cell for generating a characteristic current curve in response to said light reflected from a document passing beneath said assembly, said curve having a plurality of current values corresponding to various depths at which one of said documents is passing beneath said optical assembly, and a separate amplifier responsive to said current generated by each of said solar cells for indicating the presence of a document, said amplifier being preset to turn on at a current value corresponding to a selected distance between said document and said assembly.

2. The device as recited in claim 1 wherein said assembly is recessed from said channel wall a distance whereby said solar cell generates a maximum current when a document is at a distance flush with said wall.

3. The device as recited in claim 1 wherein said optical detector assemblies are placed directly oppositely each other on opposing walls of said channel, whereby a crumpled document is not detected as a double document.

4. A device for detecting the feeding of overlapped documents comprising:

a channel having a pair of mutually spaced opposed walls between which documents are adapted to be fed in one by one succession, means for introducing air into said channel from a point on each of said walls along the direction of document motion for separating a plurality of documents inadvertently introduced into said channel in overlapping relationship, an optical detector assembly mounted on each of said walls, each of said optical detector assemblies generating light for application into said channel and including a solar cell for generating a characteristic current curve in response to said light reflected from a document passing beneath said assembly, said curve having a plurality of current values corresponding to various depths at which one of said documents is passing beneath said optical assembly, a separate amplifier responsive to said current generated by each of said solar cells for indicating the presence of a document, said amplifier being preset to turn on at a current value corresponding to a selected distance between said document and said assembly to provide a signal indicative of a double document situation, and means responsive to each of said amplifiers for removing a double document from the document path and for storing said document separately.

References Cited by the Examiner

UNITED STATES PATENTS

| | | | |
|---|---|---|---|
| 2,617,048 | 11/1952 | Wagner et al. | 250—219 X |
| 2,834,450 | 5/1958 | Govin | 250—223 X |
| 2,994,528 | 8/1961 | Hull et al. | 271—56 |

RALPH G. NILSON, *Primary Examiner.*

WALTER STOLWEIN, *Examiner.*